United States Patent [19]
Ito

[11] Patent Number: 5,334,117
[45] Date of Patent: Aug. 2, 1994

[54] AUTOMATIC TRANSMISSION WITH AN ADD-ON EXTENSION TO INCREASE THE NUMBER OF GEAR RATIOS

[75] Inventor: Koki Ito, Hiroshima, Japan

[73] Assignee: Mazda Motor Corporation, Hiroshima, Japan

[21] Appl. No.: 59,340

[22] Filed: May 11, 1993

Related U.S. Application Data

[63] Continuation of Ser. No. 766,949, Sep. 30, 1991, abandoned.

[30] Foreign Application Priority Data

Sep. 28, 1990 [JP] Japan .................. 2-261078

[51] Int. Cl.$^5$ .................................................. F16H 3/00
[52] U.S. Cl. .................................. 475/276; 475/278; 475/285
[58] Field of Search ................ 192/18 A; 475/269-286

[56] References Cited

U.S. PATENT DOCUMENTS

| | | | |
|---|---|---|---|
| 3,859,871 | 1/1975 | Uozumi et al. ................ | 475/277 X |
| 4,263,823 | 4/1981 | Numazawa et al. ............ | 475/269 X |
| 4,774,856 | 10/1988 | Hiraiwa ......................... | 475/284 X |
| 4,798,103 | 1/1989 | Eastman et al. ............... | 192/18 A X |
| 4,914,978 | 4/1990 | Moroto et al. ................. | 475/281 X |
| 4,934,215 | 6/1990 | Miura et al. .................... | 475/283 |
| 5,059,162 | 10/1991 | Otsuka ........................... | 475/276 |
| 5,211,272 | 5/1993 | Asari et al. ..................... | 192/18 A X |
| 5,213,552 | 5/1993 | Ito .................................. | 475/276 |

FOREIGN PATENT DOCUMENTS

| | | | |
|---|---|---|---|
| 93546 | 4/1987 | Japan .............................. | 475/283 |
| 62-100357 | 6/1987 | Japan . | |
| 2181798 | 4/1987 | United Kingdom ............. | 475/283 |
| 2181799 | 4/1987 | United Kingdom ............. | 475/283 |

Primary Examiner—Leslie A. Braun
Assistant Examiner—Khoi Q. Ta
Attorney, Agent, or Firm—Keck, Mahin & Cate

[57] ABSTRACT

An automatic transmission includes first and second multi-step or speed transmissions mounted in parallel with each other with respect to a transmission shaft. The multi-step or speed transmissions are operationally coupled by a counter gear for transmitting engine torque from the first multi-step or speed transmission to the second multi-transmission. An extension unit having friction clutch elements is detachably coupled to the first multi-step or speed transmission for changing a transmission path of the engine torque through it. The number of shiftable gear ratios of the automatic transmission, therefore, can be increased.

4 Claims, 5 Drawing Sheets

| | K1 | K2 | K3 | B1 | B2 | B3 | B4 | OWC1 | OWC2 | OWC3 |
|---|---|---|---|---|---|---|---|---|---|---|
| 1st | | | O | (O) | | (O) | | O | | O |
| 2nd | O | | O | | | (O) | | | | O |
| 3rd | O | | O | | (O) | | O | | O | |
| 4th | O | O | O | | | | O | | | |
| Rev | | O | | O | | O | | | | |

FIG.2

| | K1 | K2 | K3 | K4 | K5 | B1 | B2 | B3 | B4 | OWC1 | OWC2 | OWC3 | OWC4 |
|---|---|---|---|---|---|---|---|---|---|---|---|---|---|
| 1st | | | (O) | O | | (O) | | (O) | | O | | O | O |
| 2nd | O | | (O) | O | | | | (O) | | | | O | O |
| 3rd | O | | (O) | O | | | O | | O | | O | | O |
| 4th | O | | (O) | O | O | | | | O | | | | O |
| 5th | O | | | O | O | | O | O | | | | | |
| REV | | O | | | | O | | O | | | | | |

FIG.4

AUTOMATIC TRANSMISSION WITH AN ADD-ON EXTENSION TO INCREASE THE NUMBER OF GEAR RATIOS

This is a continuation of U.S. application Ser. No. 07/766,949, filed Sep. 30, 1991, abandoned.

The present invention relates to an automatic transmission and, more particularly, to what is known as a "multi-step" or "multi-speed" automatic transmission.

BACKGROUND OF THE INVENTION

A multi-step transmission typically has a planetary gearset which changes a path in which engine torque is transmitted by various combinations of friction coupling elements so as to place the automatic transmission in, for instance, four forward gears and a reverse gear. Such an automatic transmission is well known from, for instance, Japanese Unexamined Utility Model Publication No. 62-100,357.

In an automatic transmission which has an increased number of shiftable gear ratios, for example five forward gear ratios, it is necessary to arrange a plurality of friction coupling elements in the automatic transmission differently from the manner in which the elements of a four forward gear ratio automatic transmission are arranged. From a manufacturing aspect, friction coupling elements of automatic transmissions should be compatible with automatic transmissions having different numbers of shiftable gear ratios. However, although automatic transmissions having different numbers of gear ratios have some friction coupling elements which are commonly useable, these common friction elements are not always identical in arrangement.

SUMMARY OF THE INVENTION

It is, therefore, a primary object of the invention to provide an automatic transmission having a plurality of forward gear ratios which can be provided by simply adding a gear ratio extension means to an automatic transmission having a smaller number of forward gear ratios.

The above object of the present invention is accomplished by providing an automatic transmission equipped with a torque convertor for an automobile engine which has first and second multi-transmission means mounted on first and second juxtaposed transmission shafts, respectively, and operationally coupled by counter gear means for transmitting engine torque from the first to the second multi-transmission means. The automatic transmission comprises extension means detachably coupled to the first multi-speed transmission means for changing a transmission path of engine output of the first multi-speed transmission. The number of shiftable gear ratios is made larger when the extension means is attached than it is when the extension means is detached.

Because the number of shiftable gear ratios is changed by installing or removing the extension means, at least most of the essential structural elements of the automatic transmission having a lower number of forward gear ratios are available for use in the automatic transmission having a higher number of forward gear ratios.

BRIEF DESCRIPTION OF THE DRAWINGS

The above and other objects and features of the present invention will be apparent to those skilled in the art from the following description of preferred embodiments when considered in conjunction with the drawings, wherein similar reference numerals have been used to designate the same or similar elements throughout the drawings, and in which:

FIG. 2 is a table showing combinations of activated friction coupling elements for four forward gears and a reverse gear;

FIG. 4 is a table showing combinations of activated friction coupling elements for five forward gears and a reverse gear;

DETAILED DESCRIPTION OF THE PREFERRED EMBODIMENTS

Figure 1:
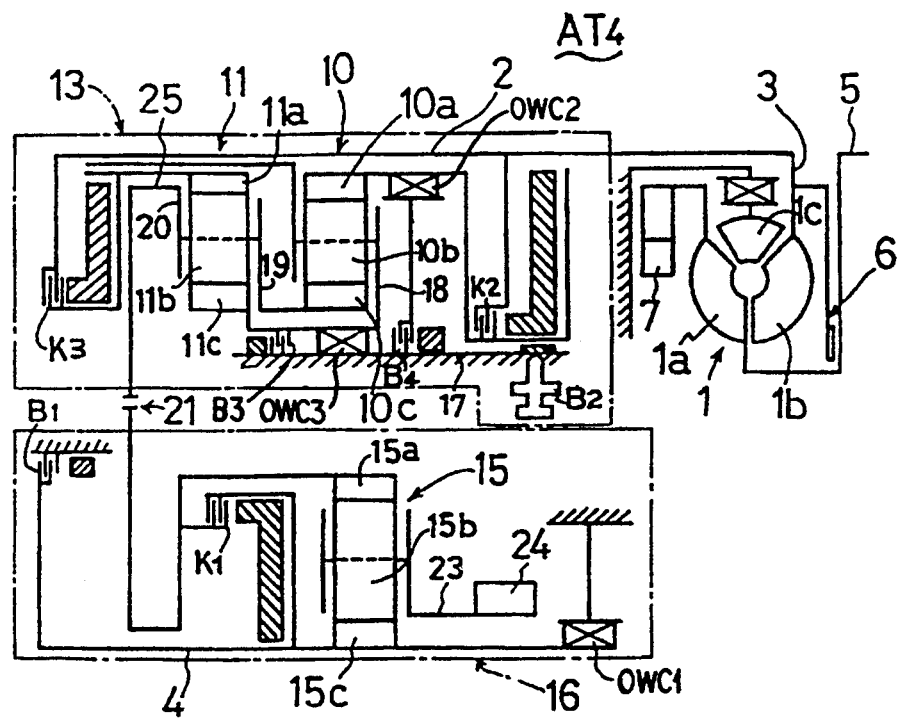
FIG. 1 is a skeleton view illustrating a four forward speed automatic transmission in accordance with a preferred embodiment of the present invention.

Referring to the drawings in detail and, in particular, to FIG. 1, a four forward speed automatic transmission AT4 in accordance with a preferred embodiment of the present invention is shown. The automatic transmission has two parallel shafts, such as a first shaft 2, integral with an output shaft 3 of a torque convertor 1, and a second shaft 4 in parallel with the first shaft 2. The torque convertor 1 comprises a pump 1a fastened to an engine output shaft 5, a turbine 1b fastened to the torque convertor output shaft 3 and a stator 1c. The pump 1a and turbine 1b are placed face to face with a slight clearance therebetween. The stator 1c is inserted between the pump 1a and turbine 1b. A lockup unit, such as a lockup clutch 6, is disposed between the convertor output shaft 3 and the engine output shaft 5 so as to mechanically lock the pump 1a and turbine 1b together when activated. A pressurized oil supply pump 7 is connected to the pump 1a of the torque convertor 1. The second shaft 4 is connected to a portion of a transmission casing 17 through a one-way clutch OWC1 at its front end and is coupled to and uncoupled from a portion of the transmission casing 17 through a clutch B1 at its rear end.

The automatic transmission AT4 comprises a first multi-speed transmission 13, such as a three speed gear transmission, including front and rear planetary gearsets 10 and 11 mounted on the first shaft 2, and a second multi-speed transmission 16, such as a two speed gear transmission, including a planetary gearset 15 mounted on the second shaft 4. The planetary gearsets 10, 11 and 15 themselves are well known in structure and operation. The front planetary gearset 10 has a sun gear 10a which is coupled to and uncoupled from the first shaft 2 by means of a clutch K2, and is coupled to and uncoupled from a portion of a transmission casing 17 by means of a brake B2 or by means of a brake B4 through a one-way clutch OWC2. The front planetary gearset 10 further has a planetary gear 10b having a front carrier 18 which is coupled to and uncoupled from a portion of the transmission casing 17 through a one-way clutch OWC3 or a brake B3.

The rear planetary gearset 11 has a sun gear 11a which can be coupled to the first shaft 2 by means of a clutch K3. The rear planetary gearset 11 further has a planetary gear 11b having a front carrier 19 which is connected to a ring gear 10c of the front planetary gearset 10, a ring gear 11c connected to a front carrier 18 of the planetary gear 10b of the front planetary gearset 10, and a rear carrier 20 operationally coupled to the second multi-speed transmission 16 mounted on the second shaft 4 through a pair of counter gears 21. The planetary gearset 15 of the second multi-speed gear transmission 16 has a ring gear 15a which is coupled to the counter gears 21 and is coupled to and uncoupled from the second shaft 4 by means of a brake K1. The planetary gearset 15 further has a sun gear 15c, which is fixedly connected to a portion of the casing 17, and a planetary gear 15b having a carrier 23 which is connected to an output gear 24. Parts shaded in FIG. 1 are pistons of various friction coupling elements, such as clutches and brakes.

The engine output is transmitted from the first shaft 2 to the second shaft 4 through the first and second multi-speed transmissions 13 and 16 coupled to each other by the counter gears 21. The automatic transmission AT4 is placed into various speed gears, such as first, second, third, fourth and reverse gears. In each speed gear, the friction coupling elements, namely, the clutches K1-K3, the brakes B1-B4, and the one-way clutches OWC1-OCW3 are selectively coupled and uncoupled as is shown in FIG. 2. In FIG. 2, the respective friction elements are coupled in speed gears indicated by circles, and the respective brakes are coupled in speed gears indicated by circles in parentheses in which engine braking is necessary. As is shown in FIG. 2, in the forward fourth speed gear (4th), the first to third clutches K1-K3 and the brake B4 are coupled, so as to directly connect the planetary gear 11b of the rear planetary gearset 11 of the first multi-speed transmission 13 to the first shaft 2, thereby providing a gear ratio of 1 (one).

Figure 3:
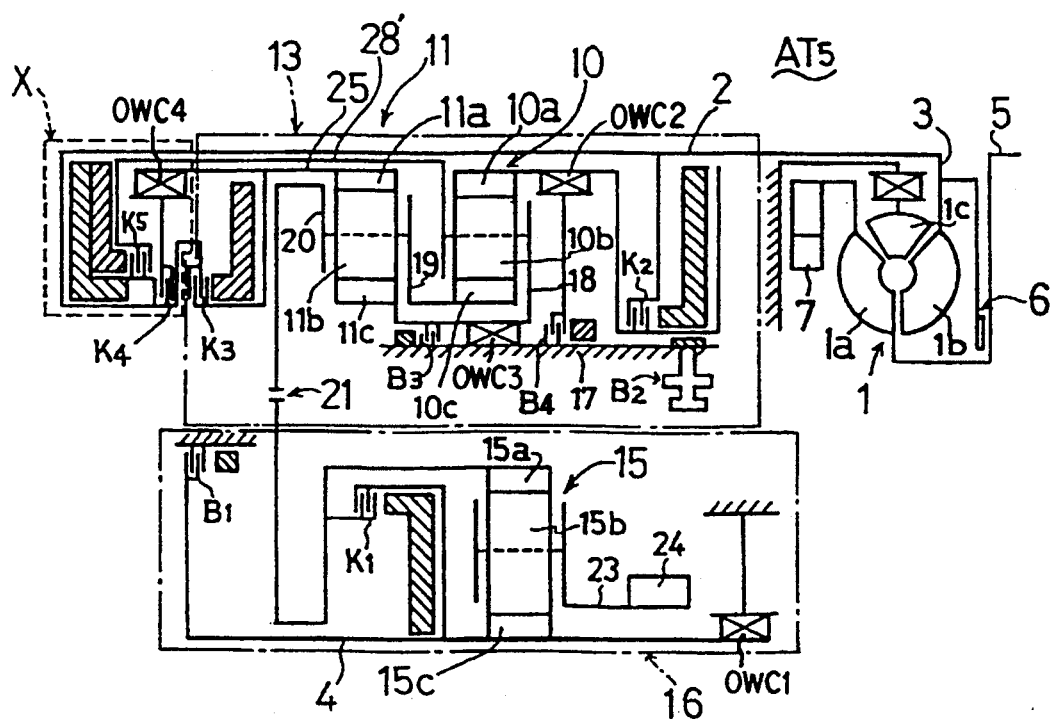
FIG. 3 is a skeleton view illustrating a five forward speed automatic transmission in accordance with a preferred embodiment of the present invention.

Referring to FIG. 3, a five forward speed automatic transmission AT5 in accordance with another preferred embodiment of the present invention is shown. This transmission AT5, in addition to the whole structure of the four forward speed automatic transmission AT4 shown in FIG. 1, includes a gear unit X for a fifth speed gear detachably mounted to the rear end of the first multi-speed transmission 13 remote from the torque convertor 1. The fifth speed gear unit X comprises clutches K4 and K5 and a one-way clutch OWC4. The clutch K4 and one-way clutch OWC4 connects and disconnects the first shaft 2 from the sun gear 11a of the rear planetary gearset 11 of the first multi-speed transmission 13. The clutch K5 connects and disconnects the first shaft 2 from the rear carrier 28 of the planetary gear 10b of the front planetary gearset 10 of the first multi-speed transmission 13.

The automatic transmission AT5 is placed into the first to fifth and reverse gears. In each speed gear, the friction coupling elements, namely, the clutches K1-K5, the brakes B1-B4 and the one-way clutches OWC1-OCW4, are selectively coupled and uncoupled as is shown in FIG. 4. The respective friction elements are coupled in speed gears indicated by circles, and the respective brakes are coupled in speed gears marked by circles in parentheses where engine braking is necessary. As is apparent from FIG. 4, the clutch K4 of the automatic transmission AT5 has the same function as the clutch K3 of the automatic transmission AT4. Also, the clutch K3 of the automatic transmission AT5 serves as a clutch effecting engine braking. In the forward fifth speed gear (5th), in addition to elements coupled in the coupling condition in the fourth speed gear, in which a gear ratio is 1 (one), the brake B4 is coupled so as to transmit the engine output to the ring gear 10c of the front planetary gearset 10 of the first multi-speed transmission 13 from the planetary gear 10b.

Figure 5:
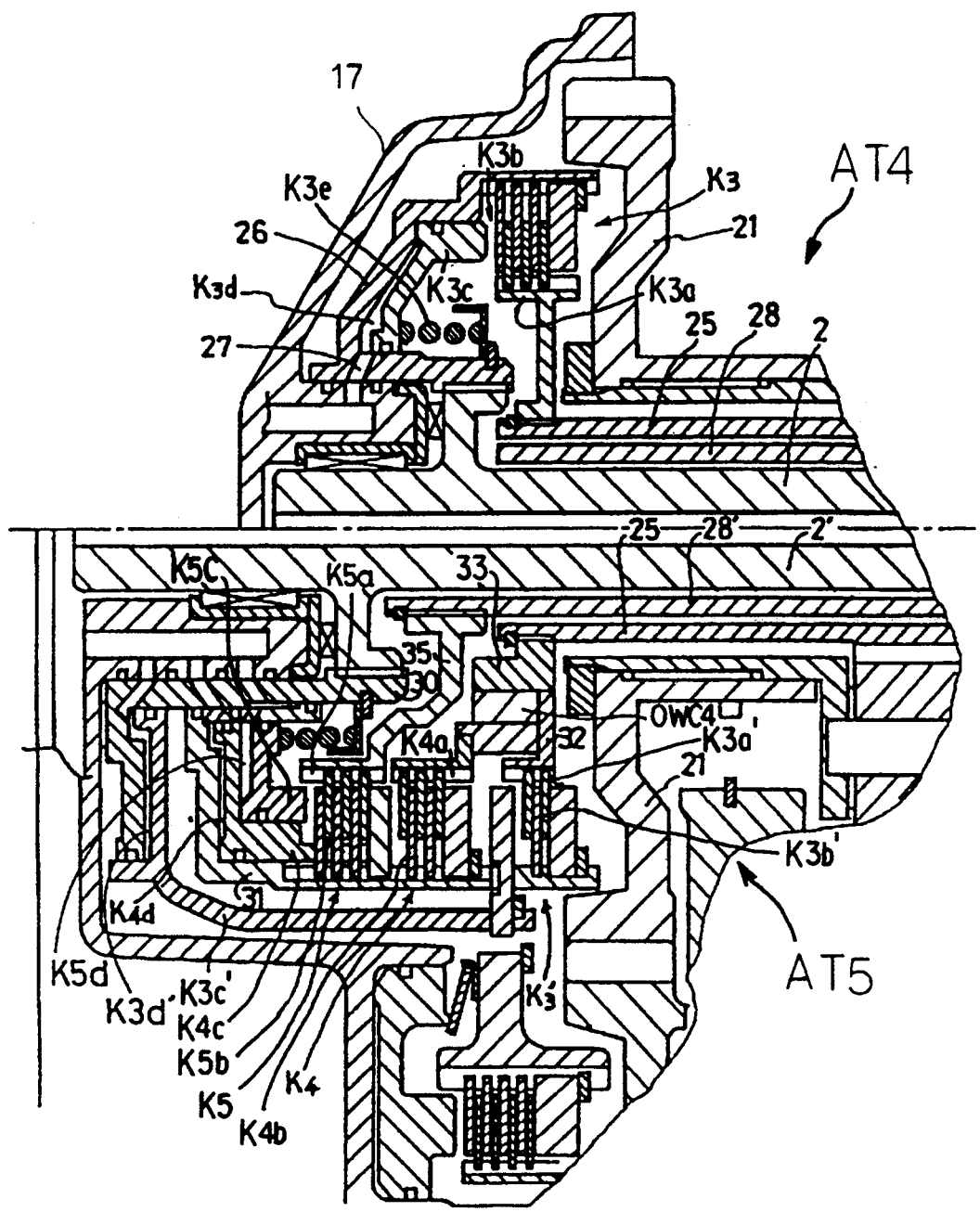
FIG. 5 is a cross-sectional view illustrating portions of the four and five speed automatic transmissions shown in FIGS. 1 and 3 in which details of a rear portion of the four forward speed automatic transmission are shown in an upper half section and details of a rear portion of the five forward speed automatic transmission are shown in a lower half section.

The four forward speed automatic transmission AT4 shown in FIG. 1 is used, as it is, as part of the five forward speed automatic transmission AT5 shown in FIG. 3. In order to clarify the compatibility of the four forward speed automatic transmission AT4, reference should be made to FIG. 5, which shows, as an upper half section, details of a rear portion of the four forward speed automatic transmission AT4 and, as a lower half section, details of a rear portion of the five forward speed automatic transmission AT5.

In the four forward speed automatic transmission AT4, the clutch K3 has a clutch ring K3a, spline-coupled to a hollow shaft 25 disposed coaxially with the first shaft 2 and coupled to the sun gear 11a of the rear planetary gearset 11 through the hollow shaft 25, and a friction element K3b having an outer periphery which is supported by a generally cylindrical ring member 26 fixedly mounted on the first shaft 2. The clutch K3 further has a hydraulic pressure chamber K3d, in communication with a hydraulic pressure line 27, formed between the generally cylindrical ring member 26 and a piston K3c, forced by a return spring K3e toward the clutch K3. Mounted between the first shaft 2 and the hollow shaft 25 is a hollow shaft 28 connected to the ring gear 11a of the rear planetary gearset 11.

The five forward speed automatic transmission AT5 with the fifth speed gear unit X has a piston K3c' having a cylindrical extension, of a clutch K3' disposed within a cylindrical member 30 mounted on the first shaft 2' so as to form a hydraulic pressure chamber K3d' between the piston K3c' and the cylindrical member 30. Within the cylindrical extension of the piston K3c', there is disposed a cylindrical member 31 with a friction ring element K3b' installed therein. The friction ring element K3b' is spline-coupled by a spline ring member K3a' to the hollow shaft 25 through cylindrical ring members 32 and 33, mounted on the hollow shaft 25, and is connected to the ring gear 11a of the rear planetary gearset 11.

The clutch K4 comprises a friction ring member K4b and a cylindrical piston K4c, both installed in the cylindrical member 31, so as to form a hydraulic pressure chamber K4d between the friction ring member K4b and piston K4c. The friction ring member K4b is connected, by a spline ring member K4a, to the ring gear 11a of the rear planetary gearset 11 through the one-way clutch OWC4 mounted on the cylindrical ring member 33 on the hollow shaft 25. The clutch K5 comprises a friction ring member K5b, installed within the cylindrical member 31, and a piston K5c, disposed within the cylindrical piston K4c, so as to form a hydraulic pressure chamber K5d between the friction ring member K5b and piston K5c. The friction ring member K5b is connected, by a spline ring member K5a, to the rear carrier 28 of the planetary gear 10b of the front planetary gearset 10 through a cylindrical spline ring member 35. The cylindrical spline ring member is connected to the hollow shaft 25.

As is clearly understood from the above, in order to convert the four forward speed automatic transmission AT4 to the five forward speed automatic transmission AT5, it is enough to attach the clutches K4 and K5 to the counter gears 21 on one end remote from the torque convertor 1 after replacing the clutch K3 with the one-way clutch OWC4. The first shaft 2 and the rear carrier 28 of the planetary gear 10b of the front planetary gearset 10 extend rearward sufficiently greatly to mount thereon the clutches K4 and K5. All parts, other than first shaft 2 and the rear carrier 28 of the four forward speed automatic transmission AT4, are available for use in the five forward speed automatic transmission AT5.

Figure 6:
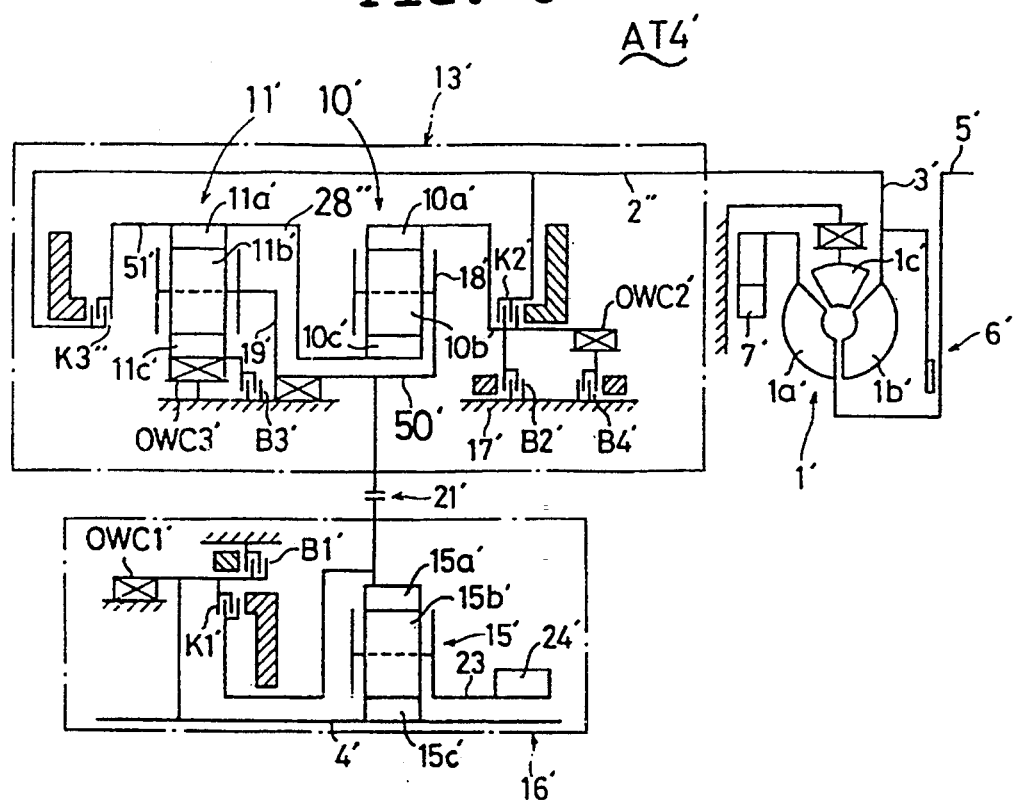
FIG. 6 is a skeleton view illustrating a four forward speed automatic transmission in accordance with another preferred embodiment of the present invention.
Figure 7:
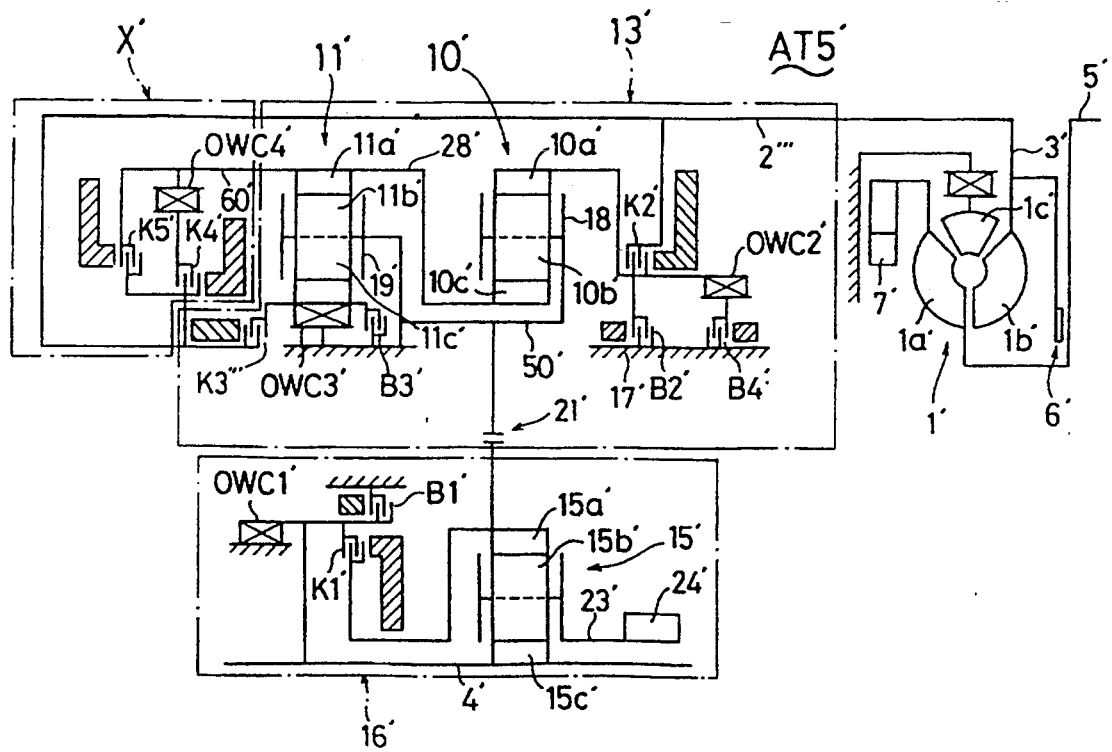
FIG. 7 is a skeleton view illustrating a five forward speed automatic transmission in accordance with the other preferred embodiment of the present invention.
Figure 8:
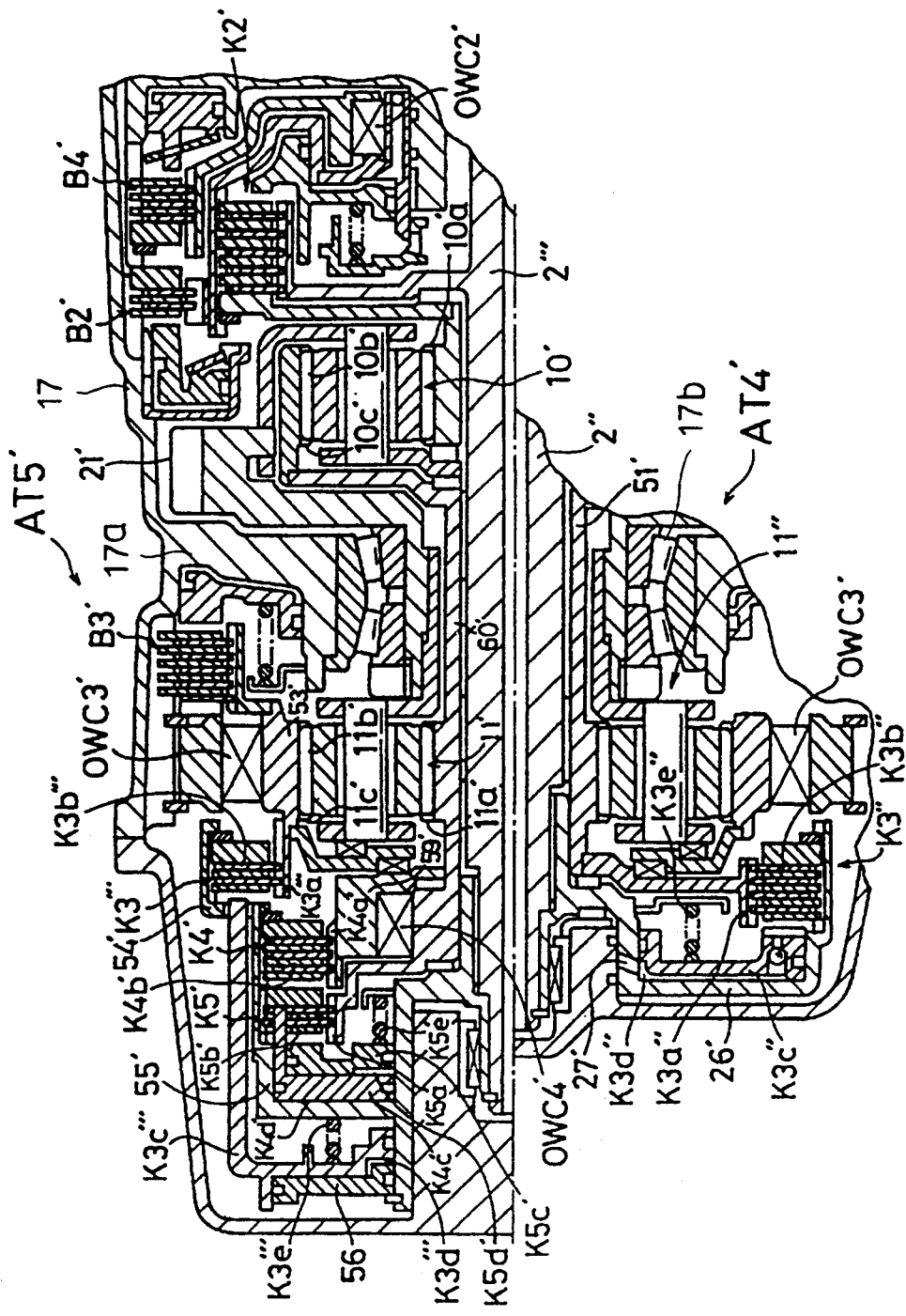
FIG. 8 is a cross-sectional view illustrating portions of the four and five speed automatic transmissions shown in FIGS. 6 and 7 in which details of a rear portion of the four forward speed automatic transmission are shown in a lower half section and details of a rear portion of the five forward speed automatic transmission are shown in an upper half section.

Referring to FIGS. 6 to 8, a four forward speed automatic transmission AT4' and a five forward speed automatic transmission AT5' in accordance with another preferred embodiment of the present invention are shown. Almost all of the essential parts are compatibly used in this embodiment. Because the four forward speed automatic transmission AT4' is almost the same in structure and arrangement as the four forward speed automatic transmission AT4, the following description will be directed primarily to differences between the four forward speed automatic transmission AT4' and the four forward speed automatic transmission AT4. As is shown in FIG. 6, the four forward speed automatic transmission AT4' includes first and second multi-speed transmissions 13' and 16'. In the first multi-speed transmission 13' a one-way clutch OWC2' is disposed axially in front of a clutch K2'. A brake B2' rather than the brake B2 of the previous embodiment shown in FIG. 1 to 5 is disposed in the same axial position as the clutch K2'. A front carrier 18' of a front planetary gearset 10' is connected to a front carrier 19' of a rear planetary gearset 11' through a connecting member 50' on which a count gear 21' is mounted A ring gear 10c' of the front planetary gearset 10' is connected to a sun gear 11a' of the rear planetary gearset 11' through a connecting member 28'. A brake B3' is located in front of a one-way clutch OWC3'. A clutch K3" is connected to a sun gear 11a' of the rear planetary gearset 11' through a connecting member 51'.

In the second multi-speed transmission 16' a brake B1' is disposed outside a clutch K1' and a one-way clutch OWC1' is disposed rearward of the clutch K1'.

Because the five forward speed automatic transmission AT5' is also almost the same in structure and arrangement as the five forward speed automatic transmission AT5, the following description will be directed primarily to differences between the five forward speed automatic transmission AT5' and the five forward speed automatic transmission AT5. As is shown in FIG. 7, the five forward speed automatic transmission AT5' is provided with a fifth speed gear unit X' attached to the multi-speed transmission 13' mounted on the first shaft 2''' at one end remote from the torque convertor 1. The fifth speed gear unit X' has two clutches K4' and K5' and a one-way clutch OWC4'. The clutch K5' and the one-way clutch OWC4' are connected to the sun gear 11a' of the rear planetary gearset 11'.

In order to describe the compatibility between the fourth and fifth forward speed automatic transmissions AT4' and AT5', reference is made to FIG. 8, which shows, as a lower half section, details of a rear portion of the four forward speed automatic transmission AT4' and, as an upper half section, details of a rear portion of the five forward speed automatic transmission AT5'.

In the four forward speed automatic transmission AT4', the clutch K3" has a clutch ring K3a", spline-coupled to a hollow shaft 51' disposed coaxially with the first shaft 2" and coupled to the sun gear 11a' of the rear planetary gearset 11' through the hollow shaft 51' and a friction element K3b". The outer periphery of the friction element K3b" is supported by a generally cylindrical ring member 26' fixedly mounted on the first shaft 2". The clutch K3" further has a hydraulic pressure chamber K3d", in communication with a hydraulic pressure line 27', formed between the generally cylindrical ring member 26' and a piston K3c". The piston K3c" is forced by a return spring K3e" toward the clutch K3".

The five forward speed automatic transmission AT5' with the fifth speed gear unit X' has a clutch K3''' connected to a cylindrical member 53' formed integrally with the ring gear 11c' of the rear planetary gearset 11' through a spline K3a'''. A cylindrical member 54', within which a friction ring element K3b''' is installed, is connected to the shaft 2''' through a cylindrical member 55'. A piston K3c' and a cylindrical member 56' behind the cylindrical member 55' are adjacent to each other so as to form a hydraulic pressure chamber K3d''' therebetween. A return spring K3e''' is disposed between the piston K3c''' and the cylindrical member 55'.

The clutch K4' is connected by a spline K4a' to a cylindrical member 59', which is fastened to a cylindrical hollow shaft 60' formed integrally with a sun gear 11a' of the rear planetary gearset 11' through a one-way clutch OWC4'. A friction ring member K4b' is disposed within the cylindrical member 55'. The cylindrical member 55' and a piston K4c', disposed in front of the cylindrical member 55', form therebetween a hydraulic pressure chamber K4d'.

A clutch K5' is connected by a spline K5a' to the cylindrical hollow shaft 60' formed integrally with a sun gear 11a' of the rear planetary gearset 11' and has a friction ring member K5b' installed within the cylindrical member 55'. The clutch K5' further has a piston K5c' disposed in front of the piston K4c' of the piston K4' so as to form a hydraulic pressure chamber K5d'. A return spring K5e' is disposed in front of the piston K5c' for biasing both the clutches K4' and K5'. The transmission casing 17 is integrally formed, at its mid-portion, with a partition wall 17a which extends radially inward between the counter gear 21 and the rear planetary gearset 11' and holds a thrust bearing 17b. The partition wall 17a with the thrust bearing 17b makes the automatic transmission very rigid in both the radial and axial directions.

As is clear from the above, in order to change the four forward speed automatic transmission AT4' into the five forward speed automatic transmission AT5' it is enough to attach the clutches K4' and K5' and the one-way clutch OWC4', as friction elements of the fifth speed gear unit X', after replacing the clutch K3" with another. In this case, although it is necessary to extend the hollow shaft 51' of the four forward speed automatic transmission AT4', as the shaft 60', with which the sun gear 11a' of the rear planetary gearset 11', is integrally formed therewith almost all of the parts, other than first shaft 2 and hollow shaft 51', of the four forward speed automatic transmission AT4' are available to the five forward speed automatic transmission AT5' for use.

It is to be understood that although the present invention has been described with respect to preferred embodiments thereof, various other embodiments and variants which fall within the scope and spirit of the invention may be apparent to those skilled in the art. Such other embodiments and variants are intended to be covered by the following claims.

What is claimed is:

1. An automatic transmission comprising:
    a first transmission shaft for transmitting engine torque into said automatic transmission;
    a second transmission shaft juxtaposed in parallel with said first transmission shaft for transmitting said engine torque from said automatic transmission;
    first multi-transmission means, mounted on said first transmission shaft, for automatically shifting the automatic transmission into a plurality of gear ratios;
    said first frictional engagement means, mounted on said first transmission shaft, for controlling operation of said first multi-transmission means;
    second multi-transmission means, mounted on said second transmission shaft, for automatically shifting the automatic transmission into a plurality of gear ratios;
    second frictional engagement means mounted on said second transmission shaft, for controlling operations of said second multi-transmission means;
    counter gear means for transmitting said engine torque from said first multi-transmission means to said second multi-transmission means;
    an extension detachably coupled to said first multi-transmission means, having frictional engagement means for increasing the number of shiftable gear ratios of said automatic transmission; and
    a torque convertor, fastened to said automatic transmission at one end of said first transmission shaft, for multiplying said engine torque, said first multi-transmission means comprising two planetary gearsets disposed coaxially on said first transmission shaft on axially opposite sides of said counter gear means.

2. An automatic transmission as recited in claim 1, further comprising a transmission casing for enclosing said automatic transmission therein, said transmission casing having a partition wall extending radially inward between said counter gear means and one of said two planetary gearsets.

3. An automatic transmission as recited in claims 2, further comprising a thrust bearing disposed between said partition wall and said first transmission shaft.

4. An automatic transmission comprising
    a first transmission shaft for transmitting engine torque into said automatic transmission;
    a second transmission shaft juxtaposed in parallel with said first transmission shaft for transmitting said engine torque from said automatic transmission;
    first multi-transmission means, mounted on said first transmission shaft, for automatically shifting the automatic transmission into a plurality of gear ratios;
    first frictional engagement means, mounted on said first transmission shaft, for controlling operation of said first multi-transmission means;
    second multi-transmission means, mounted on said second transmission shaft, for automatically shifting the automatic transmission into a plurality of gear ratios;
    second frictional engagement means mounted on said second transmission shaft, for controlling operation of said second multi-transmission means;
    counter gear means for transmitting said engine torque from said first multi-transmission means to said second multi-transmission means;
    a torque convertor, fastened to said automatic transmission at one end of said first transmission shaft, for multiplying said engine torque, said first multi-transmission means comprising two planetary gearsets both disposed between said torque converter and said counter gear means; and
    an extension means, disposed on a side of said counter gear means opposite to said two planetary gearsets and detachably coupled to said first multi-transmission means, having frictional engagement means for increasing the number of shiftable gear ratios of said automatic transmission.

* * * * *